(12) United States Patent
Dornhoefer et al.

(10) Patent No.: US 6,540,404 B1
(45) Date of Patent: Apr. 1, 2003

(54) SINTERED PLAIN BEARING FOR ENGINES AND GEARS

(75) Inventors: Gerd Dornhoefer, Leonberg (DE); Hans-Peter Koch, Stuttgart (DE); Andreas Vogt, Renningen (DE); Thomas Broghammer, Aichhalden (DE); Guido Kurz, Eschbronn-Locherhof (DE); Werner Stehr, Horb-Ahldorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,299

(22) PCT Filed: Apr. 9, 1999

(86) PCT No.: PCT/DE99/02809
§ 371 (c)(1),
(2), (4) Date: Nov. 15, 2000

(87) PCT Pub. No.: WO00/15970
PCT Pub. Date: Mar. 23, 2000

(30) Foreign Application Priority Data

Sep. 11, 1998 (DE) .......................................... 198 41 655
Aug. 9, 1999 (DE) .......................................... 199 37 567

(51) Int. Cl.[7] ............................................... F16C 33/10
(52) U.S. Cl. ........................ 384/279; 384/291; 384/902
(58) Field of Search .................................. 384/279, 902, 384/114, 286, 291, 292

(56) References Cited

U.S. PATENT DOCUMENTS 2,153,397 A * 4/1939 Sandler ...................... 384/279
5,704,718 A   1/1998 Mori ........................... 384/279
5,785,429 A * 7/1998 Jeong .......................... 384/279
6,244,749 B1 * 6/2001 Nakagawa et al. ......... 384/114
6,270,259 B1 * 8/2001 Burton ........................ 384/902

FOREIGN PATENT DOCUMENTS

| EP | 0 769 628 | 4/1997 |
| GB | 2 064 676 | 6/1981 |
| JP | 10 068418 | 3/1998 |

OTHER PUBLICATIONS

German periodical Tribologie+Schmierungstechnik, vol. 45, Jan. 1998, pp. 47–48.**

* cited by examiner

Primary Examiner—Thomas R. Hannon
(74) Attorney, Agent, or Firm—Kenyon & Kenyon

(57) ABSTRACT

A sintered plain bearing for motors and gear drives, having a running surface formed by a bearing bore and capable of having lubricant applied to it from lubricant reservoirs in the bearing, in which the bearing bore has, alternatingly distributed over the circumference, high-compaction small-pore running surfaces and axially extending low-compaction open-pore lubricant reservoirs. Lubrication is improved, especially in the initial phases of operation, by the fact that the lubricant reservoirs are constituted by channel structures having at least two longitudinal channels, and that at least in some of the channel structures, some of the channel crests remaining between adjacent longitudinal channels are in contact with the shaft received by the bearing bore in order to transfer lubricant.

15 Claims, 2 Drawing Sheets

SINTERED PLAIN BEARING FOR ENGINES AND GEARS

BACKGROUND INFORMATION

The present invention relates to a sintered plain bearing, for motors and gear drives having a running surface formed by a bearing bore and capable of having lubricant applied to it from lubricant reservoirs in the bearing, in which the bearing bore has, alternatingly distributed over the circumference, high-compaction small-pore running surfaces and axially extending low-compaction open-pore lubricant reservoirs.

A sintered plain bearing of this kind is described in the German periodical Tribologie+Schmierungstechnik, Vol. 45, 1/1998, pages 47–48. The lubricant reservoirs are introduced into the bearing bore of the sintered element as grooves that are triangular in section, while the running surfaces between the grooves are compacted by sizing. These lubricant reservoirs can readily receive lubricant that is displaced during operation from the sintered bearing, i.e. from the regions thereof that are not highly compacted, but they cannot, especially during the initial phases of operation, make a significant contribution to lubrication of the running surfaces of the bearing bore and the shaft sliding thereon.

The same is also analogously true of a sintered plain bearing as defined in U.S. Pat. No. 5,704,718, in which the lubricant reservoirs form large U-shaped grooves whose groove bottoms are stepped back from the running surfaces with a greater diameter. The lubricant accumulated in these grooves in the stationary state cannot effectively contribute to lubrication during the initial phases of operation. The lubricant reservoirs must first fill up with lubricant in order for effective lubrication of the shaft in the bearing bore to be achieved.

SUMMARY OF THE INVENTION

It is the object of the present invention, in the context of a sintered plain bearing of the kind mentioned initially, to improve lubrication especially in the initial phases of operation, without impairing the lubrication accomplished during operation by the lubricant that has passed into the lubricating oil reservoirs.

This object is achieved, according to the present invention, in that the lubricant reservoirs are constituted by channel structures having at least two longitudinal channels; and that at least in some of the channel structures, some of the channel crests remaining between adjacent longitudinal channels are in contact with the shaft received by the bearing bore in order to transfer lubricant.

Once lubricant has been taken up again, after operation, from the low-compaction region of the channel structures, i.e. once the longitudinal channels of the channel structures are lubricant-free, then at least some channel crests still remain in contact with the shaft for lubricant transfer, so that lubrication of the shaft is already occurring in the initial phase of a subsequent operating period, and then transitions into operating lubrication from the longitudinal channels.

The channel structures, introduced during pressing of the green compact, are not further compacted during sizing and therefore still have open pores, so that their storage capacity remains independent of the strength of the running surfaces.

For lubricant circulation, the configuration of the channel structures is preferably such that the width of the longitudinal channels, configured as capillary channels, is at least 20 times smaller than the height to which the lubricant being used rises in a glass capillary having a diameter of 1 mm.

The groove bottoms of the longitudinal channels, and the channel crests, are rounded and have a radius that is at least twice as small as the width of the longitudinal channels.

Since the channel crests between adjacent longitudinal channels are in contact with the shaft only for lubricant transfer thereto, they participate in non-load-bearing fashion. Their low load-bearing capacity resulting from their open pores and lower compaction has no negative repercussions on the service life of the sintered plain bearing.

In a cross-sectional plane perpendicular to a longitudinal axis of the bearing, the longitudinal channels define respective V-shapes that widen toward the shaft with an opening angle that is less than 12°.

According to a development, the lubricant storage capacity can be increased even further by the fact that additional open-pore lubricant reservoirs, shaped like channels or blind holes and adapted in terms of opening angle, width, and radius of the channel bottom to the corresponding dimensions of the longitudinal channels, are introduced into the end faces and/or the outer surface.

The open-pore lubricant reservoirs of the end faces can be configured as concentric channel rings and/or channel ring segments which are guided via radial channels to the running surface of the sintered plain bearing. The channel ring segments are longer than 0.2 mm.

Radial channels, which extend from the outer surface to the running surface of the sintered plain bearing, can also be introduced in a manner uniformly distributed over the end faces.

According to one embodiment provision is made in the context of the open-pore lubricant reservoirs in the outer surface for circumferential channels and/or circumferential channel segments and/or blind holes to be introduced into the outer surface as lubricant reservoirs. The circumferential channels and/or circumferential channel segments can be connected to one another via transversely extending connecting channels. Provision is also made, in terms of the design of all the lubricant reservoirs, for the depth of the longitudinal channels, the radial channels, the channel rings and/or channel ring segments, and the circumferential channels and/or circumferential channel segments to be less than half the height to which the lubricant rises in a glass capillary having a diameter of 1 mm.

DETAILED DESCRIPTION

Figure 1:
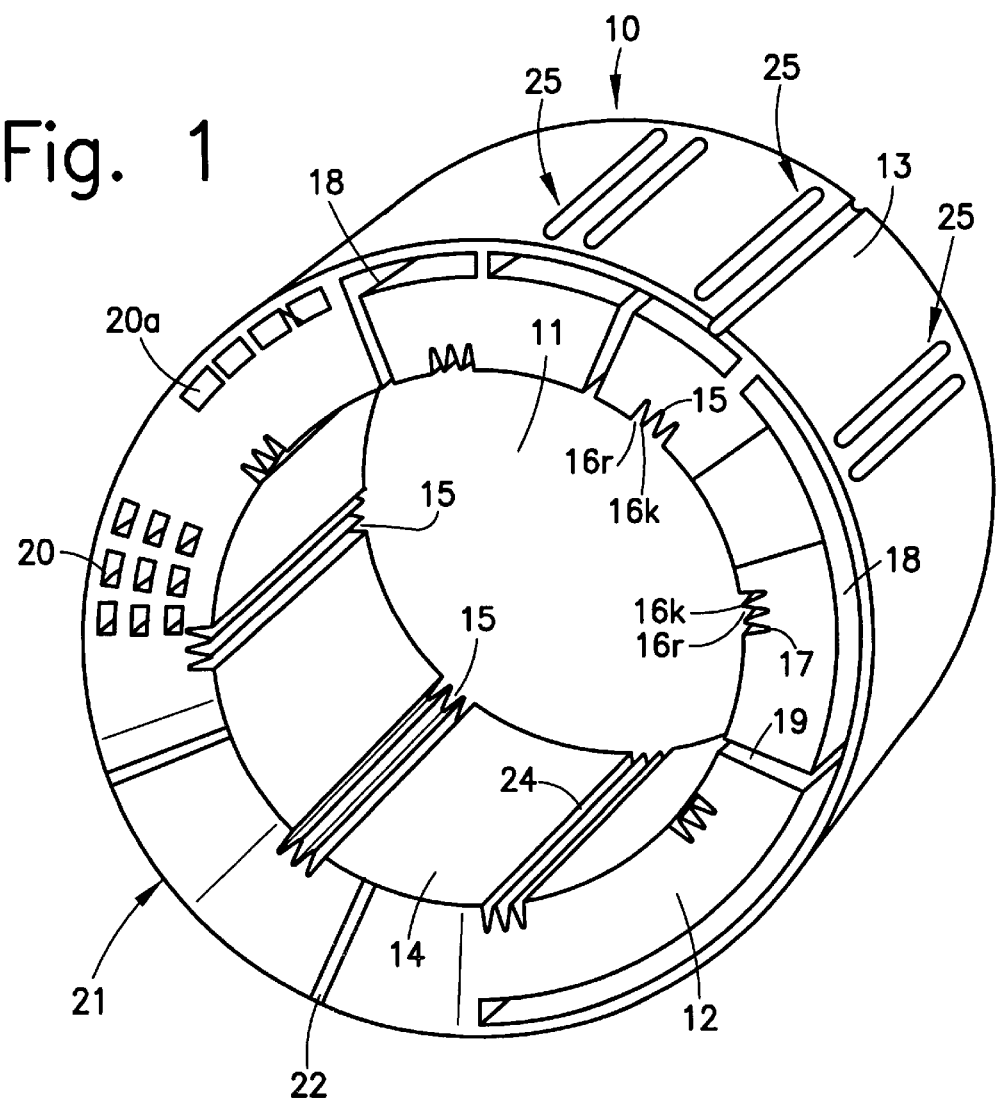
FIG. 1 shows, in a perspective view, a sintered plain bearing having channel structures as lubricant reservoirs distributed over the circumference of the bearing bore, and further lubricating oil reservoirs in the other surfaces of the sintered plain bearing, prior to sizing of the running surfaces.

As is evident from FIG. 1, in a sintered plain bearing 10 a series of channel structures 15 distributed over the circumference is introduced into the bearing bore 11 when the green compact is pressed. These channel structures 15 have at least two longitudinal channels 16r that are separated by a channel crest 16k and that preferably run parallel to one another. Channel crests 16k of these open-pore channel structures 15 are offset toward the outer circumference of sintered plain bearing 10 as compared to running surfaces 14. Channel bottom 17 of longitudinal channels 16r, and the radius of channel crests 16k, are smaller than half the width of longitudinal channels 16r, as is evident from FIG. 2. The width of longitudinal channels 16r is at least 20 times smaller than the height to which the lubricant being used rises in a glass capillary having a diameter of 1 mm.

The strength of the sintered plain bearing can be improved by adding short carbon fibers, ceramic particles, or other particles.

As is evident from FIG. 1, additional open-pore lubricant reservoirs can also be introduced into end faces 12 and/or into circumferential surface 13 of sintered plain bearing 10. The width and radius of the channel bottoms of such channel-like lubricant reservoirs are analogously governed by the corresponding dimensioning of longitudinal channels 16r of channel structures 15. The same is also true of the opening angle of longitudinal channels 16r, which is selected to be less than 12°.

Figure 3:
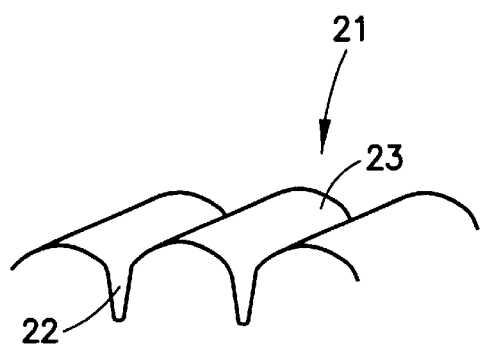
FIG. 3 shows, in perspective view, a detail of a modified embodiment of radial channels and channel crests of FIG. 1.

End faces 12 can have regions 21 equipped, for example, with radial channels 22 and channel crests 23, as shown by the detail of FIG. 1 labeled as FIG. 3. Concentric channel rings or channel ring segments 18 which lead via radial channels 19 to running surface 14 can, however, also be introduced as lubricant reservoirs.

As indicated by 20 and 20a, one or more concentric rings of short lubricant reservoirs in the form of channels or blind holes, at least 0.2 mm long, can also be introduced into end faces 12.

On outer surface 13 of sintered plain bearing 10, it is also possible to introduce, as additional open-pore lubricant reservoirs, longitudinal and circumferential channels and/or longitudinal and circumferential channel segments 25, which can be connected via transversely extending connecting channels to one another and to end faces 12.

The depth of all the channels should be less than half the height to which the lubricant being used rises in a glass capillary having a diameter of 1 mm.

The lubricant reservoirs in end faces 12 increase the external lubricant storage volume of the bearing and supply additional quantities of lubricant to the axial guiding surface. The convexly curved partial surfaces of the end segments, by way of their wedge gap effect, help improve the dynamic operating state of the bearing. The axial supply channels have an additional wear reservoir function, and allow lubricant to be transported from running surfaces 14 to outer surface 13.

Open-pore lubricant reservoirs arranged on outer surface 13 receive lubricant that emerges, and prevent it from flowing off due to gravity, centrifugal force, or creep.

After the bearing has been filled with lubricant, all the additional lubricant reservoirs are emptied again by spinning off or centrifuging, thus achieving the additional reservoir effect. The new sintered plain bearing 10 loses up to 80% less lubricant during operation. The service life of the sintered plain bearing is substantially increased, and erosion of the bearing due to the formation of transfer films is greatly inhibited.

In addition, noise when cold is reduced by the fact that the contraction in volume during cooling makes more lubricant available to the friction site.

The additional lubricant reservoirs of this kind are introduced during pressing, so higher manufacturing costs are not incurred.

The highly compacted small-pore running surfaces 14 have a high load-bearing capacity, so that the almost solid structure thereof results in a quasi-hydrodynamic frictional state for the shaft. The high porosity in the region of channel structures 15 makes an additional volume of lubricant available.

The number and width of longitudinal channels 16r and running surfaces 14 can be selected differently depending on the application (e.g. mechanical and thermal loads). In addition, the load capacity and lubricant acceptance volume can be influenced by the degree of compaction (i.e. porosity).

Channel structures 15 is considered as a function of the application profile and the configuration of running surfaces 14. Fundamentally, the number of lubricant reservoirs (configured as longitudinal channels 16r of channel structures 15) that are present should be the same as the number of running surfaces 14. The number of longitudinal channels 16r of channel structures 15 can be even or odd, and equals at least 3. The radius of longitudinal channels 16r is at least 0.05 mm, and should be no more than 0.30 mm. The depth of longitudinal channels 16r depends on the viscosity of the lubricant being used, and can be up to 0.5 mm.

Figure 2:
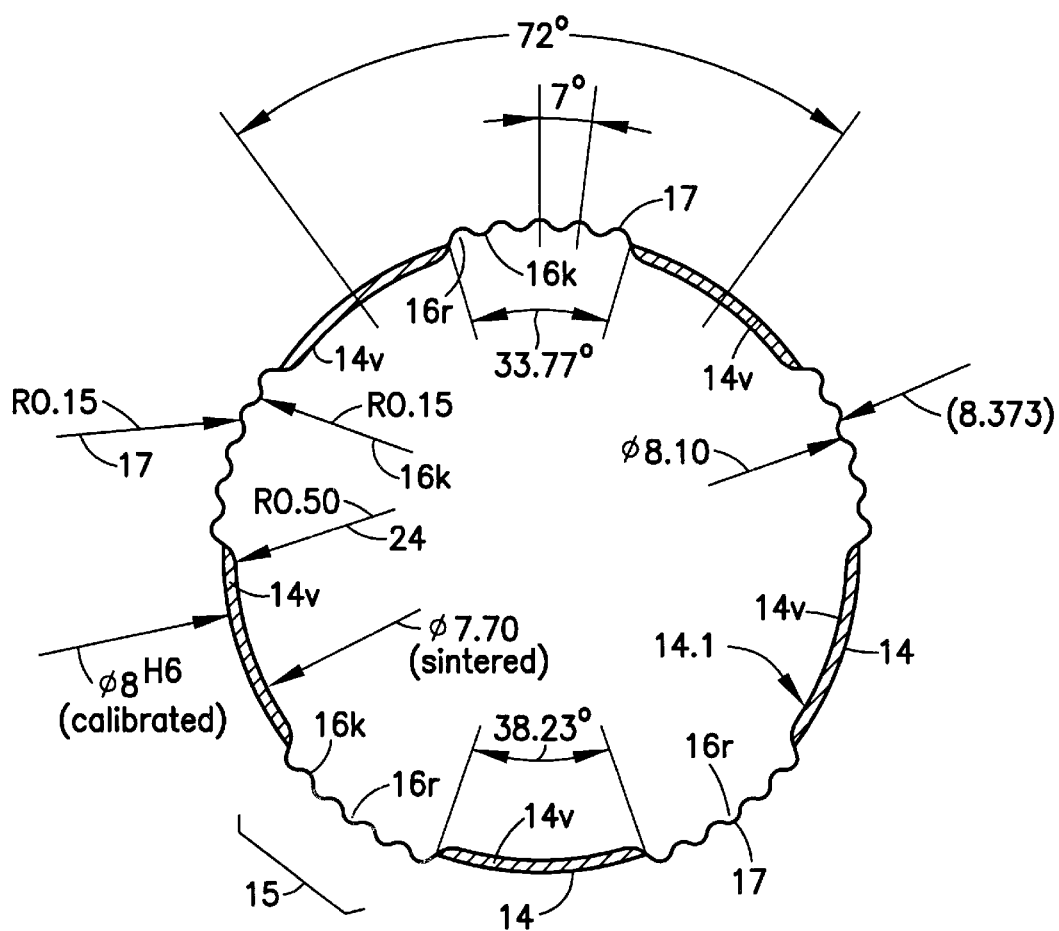
FIG. 2 shows, in cross section, the bearing bore of a differently configured sintered plain bearing before and after sizing of the running surfaces.

In the design of bearing bore 11 of a sintered plain bearing 10 as shown in FIG. 2, five segments of 72° each are provided, each segment having one channel structure 15 having five longitudinal channels 16r and four channel crests 16k. Longitudinal channels 16r located at the edge of channel structures 15 transition into running surfaces 14 via transitions 24. These transitions 24 can still have sharp edges, as shown in FIG. 1, prior to sizing of running surfaces 14. After sizing, however, they are rounded and have a radius of approximately 0.5 mm as shown in FIG. 2. Channel bottom 17 and channel crests 16k are also rounded, and have a radius of 0.15 mm. Longitudinal channels 16r extend over approximately 7° of the circumference of bearing bore 11. The depth of longitudinal channels 16r is equal to the difference in diameters: 8.373−8.10=0.273 mm. Before sizing, the unsized running surfaces 14.1 are at a diameter of 7.70 mm, whereas after sizing a bearing bore 11 with a diameter of 8 mm and a tolerance H8 is defined by running surfaces 14. Since channel crests 16k are not sized and retain their diameter of 8.10 mm, the result of bearing clearance is that at least some of bearing crests 16k are in non-load-bearing contact with the inserted shaft, which is sufficient for lubricant transfer.

Shaded regions 14v of the running surfaces are displaced during sizing and used to increase the density. Channel structures 15 extend over 33.77° (before sizing) and 38.23° (after sizing) of the circumference of the bearing bore, and transitions 24 are rounded off to 0.5 mm.

Channel crests 16k of channel structures 15 lie practically on a common enveloping surface with the sized running surfaces 14; the contact of channel crest 16k against the shaft can be in the form of only a line or strip.

What is claimed is:

1. A sintered plain bearing for a motor and a gear drive, comprising:
   a structure including a bearing bore and a running surface formed by the bearing bore, wherein:
   the running surface includes high-compaction, small-pore running surfaces,
   the structure includes axially extending, low-compaction, open-pore lubricant reservoirs for providing a lubricant for application to the running surfaces, the running surfaces and the lubricant reservoirs are alternatingly distributed over a circumference of the bearing bore, each one of the lubricant reservoirs includes a channel structure having a plurality of longitudinal channels and channel crests arranged between adjacent longitudinal channels, and at least some of the longitudinal channels are configured to be in fluid communication with a shaft adapted to be received by the bearing bore, and at least some of the channel crests are configured to be in contact with the shaft, such that corresponding ones of the channel structures transfer the lubricant to the shaft when the shaft is received by the bearing bore.

2. The sintered plain bearing according to claim 1, wherein:

a reception volume of the longitudinal channels of the channel structures is adapted to a volume of the lubricant displaced out of a sintered metal as the bearing operates.

3. The sintered plain bearing according to claim 1, wherein:

the longitudinal channels of the channel structures are configured as capillary channels, a width of the longitudinal channels is at least 20 times smaller than a height to which the lubricant rises in a glass capillary having a diameter of 1 mm.

4. The sintered plain bearing according to claim 1, wherein:

the longitudinal channels at a channel bottom and the channel crests are rounded with a radius that is at least twice as small as a width of the longitudinal channels.

5. The sintered plain bearing according to claim 1, wherein:

the channel crests are in a non-load-bearing contact with the shaft.

6. The sintered plain bearing according to claim 1, wherein:

in a cross-sectional plane perpendicular to a longitudinal axis of the bearing, the longitudinal channels define respective V-shapes that widen toward the shaft with an opening angle that is less than 12°.

7. The sintered plain bearing according to claim 1, wherein:

a strength of the structure is improved by an addition of at least one of short carbon fibers and ceramic particles.

8. The sintered plain bearing according to claim 1, wherein:

the structure includes additional open-pore lubricant reservoirs shaped as one of channels and blind holes and adapted in terms of opening angle, width, and radius of a channel bottom to corresponding dimensions of the longitudinal channels, and the additional open-pore lubricant reservoirs are introduced into at least one of end faces and an outer surface of the structure.

9. The sintered plain bearing according to claim 8, wherein:

the lubricant reservoirs are configured in the end faces as radial channels.

10. The sintered plain bearing according to claim 8, wherein:

the structure includes at least one of concentric channel rings and channel ring segments guided via radial channels to the running surfaces, and the at least one of the concentric channel rings and the channel ring segments are introduced into the end faces.

11. The sintered plain bearing according to claim 10, wherein:

the channel ring segments are longer than 0.2 mm.

12. The sintered plain bearing according to claim 1, wherein:

the structure includes at least one of longitudinal channels, circumferential channels, longitudinal channel segments, and circumferential channel segments that are introduced into an outer surface of the structure as the lubricant reservoirs.

13. The sintered plain bearing according to claim 12, wherein:

the at least one of longitudinal channels, circumferential channels, longitudinal channel segments, and circumferential channel segments are connected to one another via transversely extending connecting channels.

14. The sintered plain bearing according to claim 1, wherein:

the bearing further defines blind holes, radial channels, channel rings, channel ring segments, circumferential channels, and circumferential channel segments therein; and a depth of the longitudinal channels, blind holes, radial channels, channel rings, channel ring segments, circumferential channels, and circumferential channel segments is less than half a height to which the lubricant rises in a glass capillary having a diameter of 1 mm.

15. The sintered plain bearing according to claim 1, wherein:

the structure includes rounded transitions from the longitudinal channels to adjacent running surfaces.

* * * * *